United States Patent
Sin Xicola et al.

(10) Patent No.: US 8,178,258 B2
(45) Date of Patent: May 15, 2012

(54) ELECTROCHEMICAL DEVICE WITH A LSGM-ELECTROLYTE

(75) Inventors: Agustin Sin Xicola, Milan (IT); Elena Roda, Milan (IT); Yuri A. Dubitsky, Milan (IT); Antonio Zaopo, Milan (IT); Enrico Albizzati, Milan (IT); Evgeny Kopnin, Milan (IT)

(73) Assignee: Pirelli & C. S.p.A., Milan (IT)

( * ) Notice: Subject to any disclaimer, the term of this patent is extended or adjusted under 35 U.S.C. 154(b) by 729 days.

(21) Appl. No.: 11/597,831

(22) PCT Filed: May 31, 2004
(Under 37 CFR 1.47)

(86) PCT No.: PCT/EP2004/005961
§ 371 (c)(1),
(2), (4) Date: Aug. 14, 2009

(87) PCT Pub. No.: WO2005/117191
PCT Pub. Date: Dec. 8, 2005

(65) Prior Publication Data
US 2010/0028733 A1  Feb. 4, 2010

(51) Int. Cl.
*H01M 8/10* (2006.01)
(52) U.S. Cl. ....................................... 429/495
(58) Field of Classification Search ............. 429/479, 429/484, 485, 486, 491, 495; 423/155, 497, 423/635; 502/61, 303; 427/115
See application file for complete search history.

(56) References Cited

U.S. PATENT DOCUMENTS
6,004,688 A  12/1999  Goodenough et al.

FOREIGN PATENT DOCUMENTS
| | | |
|---|---|---|
| EP | 1450425 | 8/2004 |
| JP | 2003-151579 | 5/2003 |
| WO | WO-2004/038844 A1 | 5/2004 |

OTHER PUBLICATIONS

J.W. Stevenson, T.R. Armstrong, L.R. Pederson, J. Li, C.A. Lewinsohn, and S. Baskaran. Effect of A-site cation nonstoichiometry on the properties of doped lanthanum gallate, Solid State Ionics 1998, 113-115, 571-583.*

Zheng et al.; "Phase Constitution in Sr and Mg Doped LaGaO$_3$ SYATEM"; Materials REsearch Bulletin, vol. 39, No. 1, pp. 141-155, (2004).

(Continued)

*Primary Examiner* — Jerry Lorengo
*Assistant Examiner* — Carlos Barcena
(74) *Attorney, Agent, or Firm* — Finnegan, Henderson, Farabow, Garrett & Dunner, L.L.P.

(57) ABSTRACT

An electrochemical device including an anode, a cathode and an electrolyte membrane disposed between the anode and the cathode, wherein the electrolyte membrane has a material of formula $La_{1-x}Sr_xGa_{1-y}MG_yO_{3-0.5(x+y)}$, wherein x and y are independently a value of 0.1 to 0.3, said material having a relative density of at least 90% and including $LaSrGaO_4$ in a percentage of 0.05 vol % to 10 vol %. A method for producing energy and a method for separating oxygen from a gas mixture are also disclosed.

45 Claims, 4 Drawing Sheets

OTHER PUBLICATIONS

Kharton et al.; "Electron-Hole Transport in $(La_{0.9}Sr_{0.1})_{0.98}Ga_{0.8}Mg_{0.2}O_{3-\delta}$ Electrolyte: Effects of Ceramic Microstructure"; Electrochimica Acta, vol. 48, No. 13, pp. 1817-1828, (2003).

Ahmad-Khanlou et al.; "Material Properties of $La_{0.8}Sr_{0.2}Ga_{0.9+x}Mg_{0.1}O_{3-\delta}$ as a Function of Ga content"; Solid State Ionics, vol. 135, Nos. 1-4, pp. 543-547, (2000).

Yamaji et al.; "Chemical Stability of the $La_{0.9}Sr_{0.1}Ga_{0.8}Mg_{0.2}O_{2.85}$ Electrolyte in a Reducing Atmosphere"; Solid State Ionics, vol. 121, Nos. 1-4, pp. 217-224, (1999).

P. Majewski et al., "Processing of $(La,Sr)(GaMg)O_3$ Solid Electrolyte", Journal of Electroceramics, vol. 8, pp. 65-73, (2002).

K. Huang et al., "A solid oxide fuel cell based on $S_r$- and $M_g$-doped $LaGaO_3$ electrolyte: the role of a rare-earth oxide buffer", Journal of Alloys and Compounds, vol. 303-304, pp. 454-464, (2002).

A. Sin et al., "Gelation by Acrylamide, a Quasi-Universal Medium for the Synthesis of Fine Oxide Powders for Electroceramic Applications", Advanced Materials, vol. 12, No. 9, pp. 649-652, (2000).

A. R. West, "Solid State Chemistry and its Application", Ed. John Wiley & Sons, pp. v, 114-115 and 174-175, (1996).

X. Zhang et al.; "Interface reactions in the NiO-SDC-LSGM system", Solid State Ionics vol. 133, pp. 153-160, (2000).

Translation of JP 2003-151579.

* cited by examiner

ELECTROCHEMICAL DEVICE WITH A LSGM-ELECTROLYTE

CROSS REFERENCE TO RELATED APPLICATION

This application is a national phase application based on PCT/EP2004/005961, filed May 31, 2004, the content of which is incorporated herein by reference.

BACKGROUND OF THE INVENTION

The present invention relates to an electrochemical device, and more particularly a solid state electrochemical device composed of electrodes in contact with a solid state electrolyte membrane.

PRIOR ART

The active basic structure of an electrochemical device such as a solid oxide fuel cell (SOFC) or a gas separator/generator (e.g. oxygen generator) consists of an electrolyte layer (electrolyte membrane) interposed between an anode and a cathode. Typically, electrolyte membrane, cathode and anode contain ceramics and/or cermets.

In the solid oxide fuel cell, the cathode is supplied with oxygen (for example air) and the anode is supplied with a fuel gas ($H_2$, CO, or other gas). The cathode and the anode are porous so that the gas reaches the interface with the solid electrolyte membrane, which is composed by a material capable of conducting ionic species. Oxygen supplied to the cathode moves to the interface with the solid electrolyte through the pores in the cathode, there receives electrons from the anode and is ionized to oxide ions ($O^{2-}$). The oxide ions move toward the anode by diffusing through the solid electrolyte layer, and, close to the interface with the anode, react with the fuel gas creating reaction products (e.g. $H_2O$, $CO_2$), and releasing electrons from the anode.

Generally, electrochemical devices use yttria-stabilized zirconia (YSZ) as the electrolyte membrane. This requires an operating temperature of about 1000° C. The material interconnecting individual cells has to be stable in the oxidizing atmosphere at the cathode, in the reducing atmosphere at the anode, and at an operating temperature of about 1000° C. This implies the use of special materials, such as a conducting ceramic, for the interconnection.

An operating temperature in the range of 600°-800° C. could allow the use of an oxidation resistant stainless steel or other alloys as the interconnect material. The lower operating temperature would also reduce operating costs, increase durability, extend life service, and permit more frequent cycling.

One of the approaches to an operating temperature lower than 800° C. is the use of a solid electrolyte having an oxide-ion conductivity at or below such temperature that is comparable to that of YSZ at 1000° C. The most promising material for such approach is $CeO_2$ (ceria) doped with an alkaline-earth oxide or a rare earth oxide, but reduction of $Ce^{4+}$ to $Ce^{3+}$ in the anodic gas introduces into the electrolyte an undesired parasitic electronic leak conduction.

There is a need for a solid electrolyte having a high oxide-ion conductivity at a reduced operating temperature, negligible electronic conductivity over a wide range of oxygen partial pressure, e.g. $10^{-22} < P_{O_2} < 1$ atm, and stable performance over extended periods of time.

The perovskite system $La_{1-x}Sr_xGa_{1-y}Mg_yO_{3-0.5(x+y)}$ (hereinafter referred to as "doped gallate" or "LSGM") wherein x and y are of from 0.1 to 0.3 is attracting increasing attention as an oxide-ion solid electrolyte competitive with yttria-stabilized zirconia; it demonstrates an oxide-ion conductivity $\sigma_0 = 0.10$ S/cm at 800° C., a negligible electronic conduction at temperatures T<1000° C. over a broad range of oxygen partial pressure from pure oxygen $P_{O_2}=1$ atm) to moistened hydrogen ($P_{O_2} \sim 10^{-22}$ atm), and a stable performance over long operating periods. These superior electrical and chemical properties make it a candidate for use as the solid electrolyte in reduced-temperature electrochemical devices operating at or below 800° C.

LSGM electrolyte membranes are known, e.g. from U.S. Pat. No. 6,004,688. This patent document teaches the necessity of using a phase pure LSGM. At room temperature LSGM contains an undesirable non-conducting phase $LaSrGaO_4$ (also known as 214) which may cause the decrease of ionic conductivity of the electrolyte membrane.

Moreover, U.S. Pat. No. 6,004,688 reports that a reaction occurs between LSGM and nickel (Ni), which is often used as anode material. Such reaction brings to the formation of the metallic perovskite $LaNiO_3$, which is a poor oxide-ion conductor and may cause an undesired anode overpotential. In order to avoid the formation of $LaNiO_3$, U.S. Pat. No. 6,004,688 provides a buffer layer of, e.g., samaria- or gadolinia-doped ceria, between the anode and the electrolyte layer, so as to block the unwanted chemical reaction without suppressing the oxide-ion permeability.

P. Majewski et al., J. Electroceramics, 8(1), 65-73, 2002 relates to various methods for preparing, inter alia, $La_{0.8}Sr_{0.2}Ga_{0.8}Mg_{0.2}O_{3-x}$ with a particular focus on density and phase purity. The so-called mixed oxide route yields a LSGM single phase with a density of 90% (measured by the Archimedes method) after treating at 1400° C. for about 60 hours. At temperatures of 1400° C., the combustion synthesis yields LSGM powders containing about 5 vol % of $LaSrGa_3O_7$ phase (another secondary, non-conducting phase also known as 237), while the Pechini method, even after calcinations at 1400° C. for 6 hours, yields LSGM powders still no single-phase and containing about 5 vol % of the phases $LaSrGa_3O_7$ and $LaSrGaO_4$, and with a density of 85%.

K. Huang and J. B. Goodenough, Journal of Alloys and Compounds, 303-304 (2000), 454-464 relates to a Sr- and Mg-doped $LaGaO_3$ (LSGM) with a $LaSrGaO_4$ phase impurity. Also this paper teaches the necessity of an interfacial layer between anode and electrolyte membrane for avoiding reactions occurring between Ni and LSGM.

Problem Underlying the Invention

The Applicant faced the problem of having an electrochemical device operating at low temperatures. The use of an electrolyte membrane comprising LSGM involves various problems.

A phase pure LSGM with a high density is difficult to obtain by industrially feasible methods. The high density is desirable because it helps the mechanical strength and provides the electrolyte membrane with gas-tight feature. The presence of secondary non-conducting phases impairs the performance of the LSGM-based electrolyte membrane.

The Applicant perceived that a controlled amount of the $LaSrGaO_4$ phase in an electrolyte membrane comprising LSGM having a high density was satisfactory for the performance of the electrochemical device, in particular in term of conductivity.

The flexibility in the choice of the anode material was another issue to the Applicant. Especially, the use of nickel is attractive because of its high catalytic activity for the anode reaction and its relatively low cost, but its reactivity with LSGM demands to employ an interlayer between the anode and the electrolyte membrane.

Applicant surprisingly observed that in an electrochemical device comprising an anode containing nickel and an electrolyte membrane containing high density LSGM together with a controlled amount of LaSrGaO$_4$, formation of by-product LaNiO$_3$ is substantially avoided.

SUMMARY OF THE INVENTION

Therefore, the present invention relates to an electrochemical device comprising an anode, a cathode and an electrolyte membrane disposed between said anode and said cathode, wherein said electrolyte membrane comprises a material of formula $$La_{1-x}Sr_xGa_{1-y}Mg_yO_{3-0.5(x+y)}$$

wherein x and y are independently a value of from 0.1 to 0.3, extremes included, said material having a relative density of at least 90% and comprising LaSrGaO$_4$ in a percentage of from 0.05 vol % to 10 vol %, extremes included.

Examples of electrochemical devices according to the present invention are solid oxide fuel cells (SOFCs), molten carbonate fuel cells (MCFCs), gas separators and gas sensors.

Preferably, the anode and cathode of the electrochemical device of the invention show a porosity of at least 10%, more preferably of at least 30%.

In a first preferred embodiment, the anode of the electrochemical device of the present invention comprises a cermet wherein the metallic portion is an alloy including nickel and at least a second metal selected from aluminium, titanium, molybdenum, cobalt, iron, chrome, copper, silicon, tungsten and niobium, and the ceramic portion is selected from doped ceria and La$_{1-x}$Sr$_x$Ga$_{1-y}$Mg$_y$O$_{3-0.5(x+y)}$ wherein x and y are as above. Reference is made to WO04/038844 in the Applicant's name.

Preferably, said alloy has an average particle size not higher than 20 nm, more preferably not higher than 16 nm.

Advantageously, the alloy shows a mean surface area higher than 20 m$^2$/g, preferably higher than 30 m$^2$/g, and more preferably higher than 40 m$^2$/g.

Preferably the alloy has a second metal content of from about 1% by weight to about 99% by weight, more preferably, and even more preferably from about 40% by weight to about 60% by weight. Advantageously, said second metal is copper.

Preferably the alloy has a nickel content of from about 1% by weight to about 99% by weight, more preferably from about 30% by weight to about 70% by weight, and even more preferably of about 50% by weight.

The ceramic portion of said cermet advantageously shows a particle size not higher than 50 nm, preferably from about 1 to about 25 nm.

Preferably, the ceramic portion is doped ceria selected from gadolinia-doped ceria (CGO) and samaria-doped ceria (SDC).

Optionally, the anode of the first embodiment of the invention comprises cerium oxide (CeO$_2$), optionally added with additives like cobalt.

Advantageously, the electrochemical device of the invention comprises and anode containing nickel and an electrolyte membrane comprising a material of formula La$_{1-x}$Sr$_x$Ga$_{1-y}$Mg$_y$O$_{3-0.5(x+y)}$ wherein x and y are independently a value of from 0.1 to 0.3, extremes included, said material having a relative density of at least 90% and comprising LaSrGaO$_4$ in a percentage of from 0.05 vol % to 10 vol %, extremes included, said electrolyte membrane being in direct contact with at least said anode, i.e. no additional layers are interposed between the anode and the electrolyte membrane.

In a second embodiment, the anode of the electrochemical device of the invention comprises a ceramic containing at least one of cobalt and iron, said ceramic being mixed with doped ceria.

Preferably, the ratio ceramic/doped ceria is of from about 50:50 to about 95:5, more preferably from about 60:40 to about 80:20.

Preferably said ceramic has a perovskite structure or a perovskite-related structure. The term "perovskite" and "perovskite-related" refer to a class of materials comprising a structure based upon the structure of the mineral perovskite, CaTiO$_3$. In its idealized form, the perovskite structure has a cubic lattice in which a unit cell contains metal ions at the corners of the cell, another metal ion in its center and oxygen ions at the midpoints of the cube's edges. This is referred to as an ABO$_3$-type structure, in which A and B represent metal ions.

Preferably said ceramic contains cobalt and iron.

Examples of said ceramic have a formula

M$_{2-z}$Sr$_z$Fe$_{2-w}$Co$_w$O$_{5\pm\delta}$ wherein M is Ca or a rare earth element; z and w are independently a value of from 0 to 2, extremes included, and δ is from stoichiometry; or M$_a$Sr$_{1-a}$Fe$_{1.5-b}$Co$_b$O$_{3+\delta}$ wherein M is Ca or a rare earth element; wherein a and b are independently a value of from 0 to 0.7, extremes included, and δ is from stoichiometry.

For example, the ceramic of the anode of the second embodiment is La$_{0.8}$Sr$_{0.2}$FeO$_3$.

Also, a ceramic for the anode of the second embodiment of the invention can be a lanthanum strontium cobalt iron oxide having, for example, a general formula La$_{1-c}$Sr$_c$Co$_{1-d}$Fe$_d$O$_{3-\delta}$, wherein c and d are independently a value of from 0 to 1, extremes included, and δ is from stoichiometry. Preferred is a lanthanum strontium cobalt iron oxide of formula La$_{0.6}$Sr$_{0.4}$Co$_{0.2}$Fe$_{0.8}$O$_{3-\delta}$ (hereinafter referred to as LSCF-80).

Preferably, the anode of the second embodiment of the invention is metal-free. With metal-free it is intended that none of the elements present in the anode is in a metallic form.

The doped ceria of the second embodiment can be selected from the same of the same class of materials defined above for the first embodiment.

A first type of cathode for the electrochemical device of the invention can comprise a metal such as platinum, silver or gold or mixtures thereof, and an oxide of a rare earth element, such as praseodymium oxide.

A second type of cathode can comprise a ceramic selected from

La$_{1-e}$Sr$_e$Mn$_f$O$_{3-\delta}$, wherein e and f are independently a value of from 0 to 1, extremes included, and δ is from stoichiometry; and La$_{1-c}$Sr$_c$Co$_{1-d}$Fe$_d$O$_{3-\delta}$, wherein c, d and δ are as above.

Said second type of cathode can further comprise a doped ceria.

A third type of cathode can comprise materials above mentioned for the cathodes of the first and second type.

Preferably, the electrolyte membrane material of formula La$_{1-x}$Sr$_x$Ga$_{1-y}$Mg$_y$O$_{3-0.5(x+y)}$ has a perovskite structure.

Preferably said material is of formula La$_{0.8}$Sr$_{0.2}$Ga$_{0.8}$Mg$_{0.2}$O$_{3-\delta}$.

Advantageously said material has a relative density of from about 95% to about 99%, extremes included.

Preferably, LaSrGaO$_4$ is present in a percentage of from 0.1 vol % to 6 vol %, extremes included.

Advantageously LaSrGaO$_4$ is present in an amount increasing from the surface to the interior of the electrolyte membrane. Preferably, the amount of LaSrGaO$_4$ at the surface of the electrolyte membrane is substantially null.

Advantageously, the electrolyte membrane material of formula

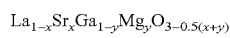

$$La_{1-x}Sr_xGa_{1-y}Mg_yO_{3-0.5(x+y)}$$

is substantially free from LaSrGa3O$_7$. As "substantially free" it is intended that the percentage of LaSrGa3O$_7$ is lower than 2 vol %. The anode, the cathode and the electrolyte membrane of the electrochemical device of the invention can be prepared by known methods.

Preferably, at least the electrolyte membrane is produced by performing at least the following steps of
- thermally treating an aqueous solution comprising metal cations, at least one hydrosoluble ethylenically unsaturated monomer with an ester moiety, and a hydrosoluble cross-linking monomer with at least two ethylenically unsaturated ester moieties, to provide a gel and to obtain said metal cations in an oxide form;
- calcining said gel to remove organic substances and to form a crystal phase of said metal oxides in nanosize powder form;
- sintering said powder to provide the ceramic material.

As aqueous solution is intended a solution wherein as solvent water or a mixture of water and at least one hydrosoluble solvent is used. As hydrosoluble solvent an alcohol, glycol, tetrahydrofurane, dioxane may be used.

The metal cations solution can be obtained by dissolving hydrosoluble precursors thereof. Examples of precursors are oxides, chlorides, carbonates, β-diketonates, hydroxides, nitrates, acetates, oxalates, and mixtures thereof.

Advantageously, the concentration of each of the metal cations in the aqueous solution is higher than 0.5 mol/l, preferably from 1 to 10 mol/l.

Preferably, hydrosoluble ethylenically unsaturated monomers with an ester moiety used for producing the electrochemical device of the present invention

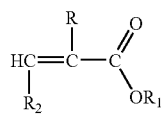

(I)

are encompassed by the general formula (I) wherein R is hydrogen, (C$_1$-C$_4$)alkyl, aryl or aryl(C1-C4)alkyl; R$_1$ is a C$_1$-C$_8$ hydrocarbon group containing at least one polar group selected from —COOH, —NH$_2$, —NHR', —N(R')$_2$, —OH, —OR'—SO$_3$H, —SH, wherein R' is a (C$_1$-C$_6$)alkyl group; and R$_2$ is hydrogen, methyl, ethyl, propyl or phenyl.

Preferably R' is a (C$_1$-C$_4$)alkyl group.

Examples of monomers of formula (I) are (meth)acrylate monomers such as 2-hydroxyethyl acrylate, 2-hydroxypropyl acrylate, 2-hydroxyethyl methacrylate, 2-hydroxypropyl methacrylate, 2-hydroxyethyl phenacrylate, hydroxybutyl acrylate, hydroxybutyl methacrylate, butandiol monoacrylate, 2-(2-ethoxyethoxy)ethyl acrylate, dimethylamino ethyl acrylate, and dimethylamino ethyl methacrylate.

Cross-linking monomers useful for producing the electrochemical device of the invention are preferably selected from diacrylates and triacrylates wherein the acrylates groups are linked to alkoxylated moieties or polyoxyalkylene linear units. Examples are polyethylene glycol, dimethacrylate, ethoxylated trimethylolpropane triacrylate.

Advantageously, said aqueous solution comprises a hydrosoluble polymerization initiator, such as α,α'-azaisobutyronitrile (AIBN), tetramethylene-ethylenediamine, peroxides, e.g. hydrogen peroxide, benzoyl peroxide or dicumyl peroxide, persalts, e.g. ammonium, sodium or potassium persulfate.

Preferably, the aqueous solution is thermally treated at a temperature ranging between about 50° C. and about 150° C.

By the term "gel" as used throughout the specification and claims, it is intended a jellylike, non-flowable structure based on a polymeric network entrapping a liquid phase comprising solvent, reactants and not cross-linked polymer chains.

Before proceeding to the calcining step, the gel obtained by the process of the invention is optionally dried to obtain a xerogel.

Said xerogel is a substantially dry, hard gel resulting from the removal of the aqueous phase from the gel, which usually causes a shrinkage of the gel network.

This optional drying step is preferably carried out by heating at a temperature ranging between about 80° C. and about 300° C.

Advantageously, the xerogel is disaggregated by known techniques, e.g. grinding or ball-milling, and subjected to the calcining step.

The calcining step is preferably carried out at a temperature ranging between about 300° C. and about 1500° C. This treatment results in the removal of residual impurities such as solvent and organic substances, and the crystallization of the oxide or mixed oxide phase in form of a nanosize powder.

In an embodiment of the invention, the calcining step is carried out by progressively increasing temperature. This is preferable when the temperature for eliminating the impurities is different, and it is typically lower, than the crystallization temperature. Advantageously, at least one grinding step of the powder is carried out at an intermediate stage of the calcining step.

As "nanosize powder" it is intended a powder having a mean primary grain size lower than 1,000 nm, preferably lower than 100 nm. Advantageously, the nanosize powders obtained by the process of the invention show a mean primary grain size lower than 20 nm, for example comprised between about 3 nm and 15 nm.

By the term "primary grain size" as used throughout the specification and claims, it is intended the size of the primary particles which are distinguishable units in a transmission electron micrograph (TEM).

Advantageously, before the sintering step the nanosize powder is treated at a temperature of 700° C.-1100° C.

Advantageously, before the sintering step the nanosize powder is compacted in pellets or shaped in form of electrolyte membrane for the electrochemical device of the invention.

Advantageously, the ceramic material is obtained already in the shape suitable for the electrolyte membrane of the electrochemical device of the invention.

Alternatively, at least the electrolyte membrane of the electrochemical device of the invention can be prepared according to A. Sin and P. Odier, Advanced Materials, Vol. 12, No. 9 (2000)649-652.

In a further aspect, the present invention relates to a method for producing energy comprising the steps of:
- feeding at least one fuel into an anode side of a solid oxide fuel cell comprising an anode, a cathode and an electrolyte membrane disposed between said anode and said cathode, wherein said electrolyte membrane comprises a material of formula La$_{1-x}$Sr$_x$Ga$_{1-y}$Mg$_y$O$_{3-0.5(x+y)}$ wherein x and y are independently a value of from 0.1 to 0.3, extremes included, said material having a relative density of at least 90% and comprising LaSrGaO$_4$ in a percentage of from 0.05 vol % to 10 vol %, extremes included;

feeding an oxidant into a cathode side of said solid oxide fuel cell; and oxidizing said at least one fuel in said solid oxide fuel cell, resulting in production of energy.

A fuel suitable for the method of the present invention can be selected from hydrogen; an alcohol such as methanol, ethanol, propanol; a hydrocarbon in gaseous form such as methane, ethane, butene; carbon dioxide, carbon monoxide, natural gas, reformed natural gas, biogas, syngas and mixture thereof, in the presence of water (steam fuel); or an hydrocarbon in liquid form, e.g. diesel, toluene, kerosene, jet fuels (JP4, JP-5, JP-8, etc). Preferably the fuel is methane.

Advantageously, the hydrocarbon fuel is substantially dry. As "substantially dry" it is intended that the water content can be lower than 10 vol %. The substantially dry fuel is directly oxidized at the anode side. Preferred for the present invention is substantially dry methane.

Advantageously, the solid oxide fuel cell employed by the method of the invention operates at a temperature ranging between about 400° C. and about 800° C., more preferably between about 500° C. and about 700° C.

Besides the possibility of skipping the necessity of using special thermo-resistant material, an advantage provided by low operating temperatures, such those preferred by the present invention, is the reduction of NO$_x$ formation at the cathode. The formation of such undesired by-products is due to the reaction of the nitrogen present in the air fed at the cathode side, such reaction being related to temperature increase.

The solid oxide fuel cell according to method of the invention substantially displays a great flexibility in the choice of the fuel to be fed with. Besides hydrocarbons, it can performs by feeding the anode also with hydrogen, or with a wet hydrocarbon fuel (in the case of methane, generally 1:3 methane/water) to provide reformed fuel.

In case of operating with reformed fuel, the fuel can be internally reformed at the anode side.

In another further aspect, the present invention relates to a method for separating oxygen from a gas mixture, comprising the steps of:

feeding the gas mixture into a cathode side of a gas separator comprising an anode, a cathode and an electrolyte membrane disposed between said anode and said cathode, wherein said electrolyte membrane comprises a material of formula La$_{1-x}$Sr$_x$Ga$_{1-y}$Mg$_y$O$_{3-0.5(x+y)}$ wherein x and y are independently a value of from 0.1 to 0.3, extremes included, said material having a relative density of at least 90% and comprising LaSrGaO$_4$ in a percentage of from 0.05 vol % to 10 vol %, extremes included;

applying an external potential difference between the cathode and the anode;

dissociating the oxygen at the cathode to yield oxygen ions;

diffusing the oxygen ions through the electrolyte membrane from the cathode to the anode; and converting the diffused oxygen ions to oxygen at the anode. Preferably, the gas mixture of the above method is air.

BRIEF DESCRIPTION OF THE DRAWINGS

The invention will be further illustrated hereinafter with reference to the following examples and figures, wherein.

DETAILED DESCRIPTION OF THE PREFERRED EMBODIMENTS

Figure 1:
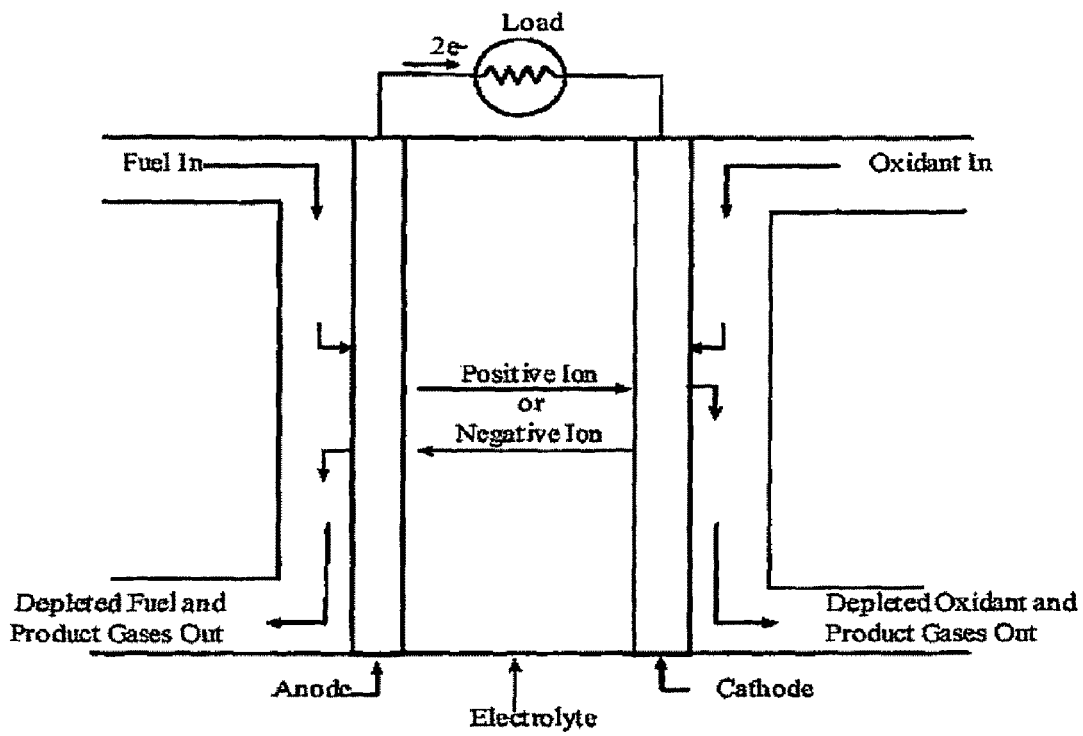
FIG. 1 schematically shows an electrochemical device according to the invention.

FIG. 1 schematically illustrates an electrochemical device which is a solid oxide fuel cell comprising anode, cathode and electrolyte membrane (indicated as "electrolyte") with the reactant/product gases and the ion conduction flow directions through the cell. Gaseous fuels, e.g. hydrogen or hydrocarbons, are fed continuously to the anode (negative electrode) and an oxidant (i.e., oxygen from air) is fed continuously to the cathode (positive electrode); the electrochemical reactions take place at the electrodes to produce an electric current.

The architecture of a gas separator is substantially analogous (anode, cathode and electrolyte membrane). Similarly to a fuel cell, air or an oxygen containing gas is provided to the cathode. By an electrical potential applied across an oxygen ion conductive electrolyte membrane via electrodes, oxygen is dissociated and reduced at the cathode. Oxygen ions travel through the electrolyte, and are oxidized and recombined at the anode to produce oxygen.

EXAMPLE 1

Preparation of Cu$_{0.47}$Ni$_{0.53}$ and Ce$_{0.8}$Gd$_{0.2}$O$_{1.9}$ Cermet 1.164 g of Cu was added with 5 ml of H$_2$O while stirring and heating up to boiling. HNO$_3$ (3.5 ml; 63%) was dropwise added. 1.212 g of Ni was then added followed by HNO$_3$ (63%) up to a total acid volume of 4.3 ml.

The resulting mixture was added with 5.992 g. of Ce(NO$_3$)$_3$×6H$_2$O, 1.370 g of Gd(NO$_3$)$_3$×6H$_2$O and water up to a total volume of 15 ml to provide a solution with a metal cation concentration of 3.747 mol/l.

The resulting mixture was added with 15 ml of 2-hydroxyethylmethacrylate, 7.5 ml of polyethylene glycol dimethacrylate and 100 mg of AIBN, and heated (80° C.) up to the gel formation.

The gel was dried at 200° C. for 2 h to yield a xerogel which was ground, crashed and decomposed at 500° C. for 1 h. A powder mixture (6 g) of CuO, NiO, Cu$_{0.47}$Ni$_{0.53}$O and Ce$_{0.8}$Gd$_{0.2}$O$_{1.9}$ (hereinafter CGO-20) was obtained and characterized as follows.

Figure 2:
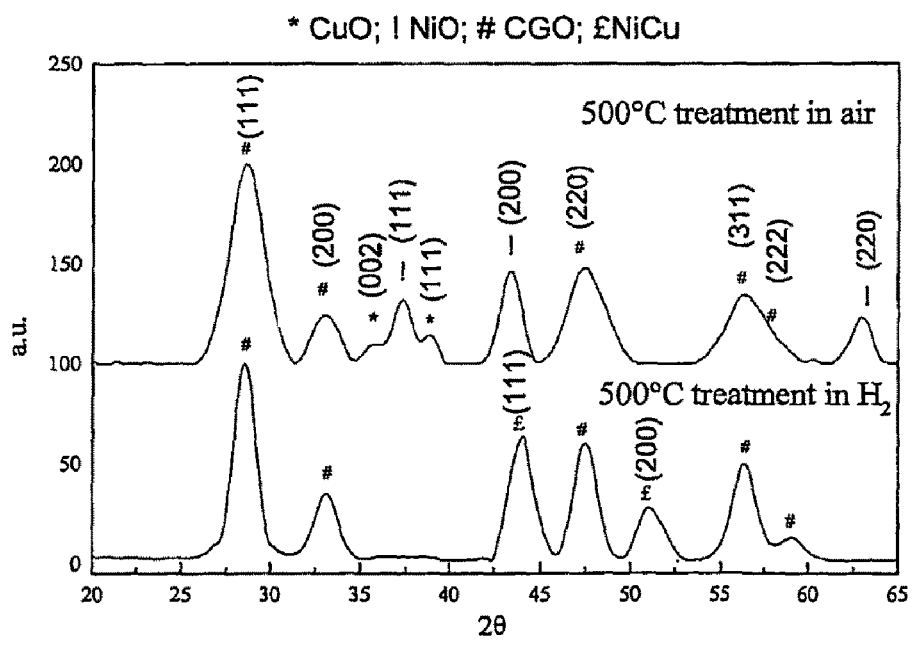
FIG. 2 shows the X-ray diffraction (XRD) pattern of an anode powder.

FIG. 2 shows the XRD analysis of the powder mixture. The mean primary grain size was calculated from the XRD patterns by use of the Debye-Scherrer formula (A. R. West "Solid State Chemistry and its application" Ed. John Wiley & Sons, 1996, page 174) giving values of 10 nm for NiO (together with the isostructural phase (Ni, Cu)O), 12 nm for CuO and 5 nm for CGO-20. The TEM imaging was in agreement with the calculated mean primary grain size. Moreover, it is not possible to distinguish all phases by shape due to their intimate mixing. The powders were weakly agglomerated as from SEM images.

The powder mixture was reduced at 500° C. for 2 h in $H_2$ (100%) to give the title cermet. According to the XRD pattern of FIG. 2 the resulting NiCu alloy pure phase has a mean primary grain size of 8 nm, and the CGO-20 has a mean primary grain size of 6 nm.

EXAMPLE 2

Preparation of $La_{0.60}Sr_{0.40}Fe_{0.80}Co_{0.20}O_{3-\delta}$/$Ce_{0.8}Gd_{0.2}O_{1.9}$ A. Cerium/Gadolinium Oxides Powder and $Ce_{0.8}Gd_{0.2}O_{1.9}$
1.8716 g of $Ce(NO_3)_3.6H_2O$ and 0.4279 g of $Gd(NO_3)_3.6H_2O$ were added to 10 ml of $H_2O$ while stirring and heating up to 50° C. resulting in a concentration of 0.538 mol/l of $H_2O$. Subsequently, 10 ml of 2-hydroxyethyl-methacrylate and 5 ml of poly(ethyleneglycol)diacrylate were added. The solution was heated up to 100° C. 20 drops of 35% $H_2O_2$ were added to initiate the gel formation. The resulting gel was decomposed at 500° C. for 5 h. 1 g of the title compound was obtained and characterized as follows.

$Ce_{0.8}Gd_{0.2}O_{1.9}$ powder showed an average particle size of 10 nm calculated using the Debye-Scherrer formula (A. R. West "Solid State Chemistry and its application" Ed. John Wiley & Sons, 1996, page 174).

B. $La_{0.60}Sr_{0.40}Fe_{0.80}Cu_{0.20}O_{3-\delta}$ Powder
1.0064 g of $La(NO_3)_3.6H_2O$, 0.3278 g of $Sr(NO_3)_2$, 1.2596 g of $Fe(NO_3)_3.9H_2O$ and 0.2254 g of $Co(NO_3)_2.6H_2O$ were added to 10 ml of $H_2O$ while stirring and heating up to 50° C. resulting in a concentration of 0.776 mol/l of $H_2O$. Subsequently, 10 ml of 2-hydroxyethylmethacrylate and 5 ml poly-(ethyleneglycol)diacrylate were added. The solution was heated at 80° C. 20 drops of 35% $H_2O_2$ were added to initiate the gel formation. The resulting gel was decomposed at 500° C. for 5 h and at 700° C. for 5 h. 1 g of the title compound were obtained. The powder showed an average particle size of 10 nm calculated using the Debye-Scherrer formula (A. R. West "Solid State Chemistry and its application" Ed. John Wiley & Sons, 1996, page 174).

C. 0.35 g of $La_{0.60}Sr_{0.40}Fe_{0.80}Co_{0.20}O_{3-\delta}$ (70 wt %) and 0.15 g of $Ce_{0.8}Gd_{0.2}O_{1.9}$ (30 wt %) were mixed in agate mortar. Then, 1 ml of isopropyl alcohol was added and the obtained slurry was treated in ultrasound bath for 1 hour.

EXAMPLE 3

$La_{0.20}Sr_{0.80}Ga_{0.80}Mg_{0.20}O_{2.8}$
Containing $LaSrGaO_4$ Phase 1.1086 g of $La(NO_3)_3.6H_2O$, 0.1641 g of $Mg(NO_3)_2.6H_2O$, 0.1354 g of $Sr(NO_3)_2$ and 0.6762 g of $Ga(NO_3)_3$ $0.5H_2O$ were dissolved in 75 ml of $H_2O$. The solution was heated at 60° C., than 5.6935 g of acrylamide, 0.6328 g of bis-acrylamide and about 15 drops of $H_2O_2$ are added. The heating temperature was increased, and at 80° C. gel formation began. The gel was dried in microwave oven for some minutes. A xerogel was obtained and crashed and decomposed at 500° C. for 2 hours. The resulting powder was treated at 1450° C. for 5 hours.

The powder showed an average particle size of 40 nm calculated using the Debye-Scherrer formula (A. R. West "Solid State Chemistry and its application" Ed. John Wiley & Sons, 1996, page 174).

Figure 3:
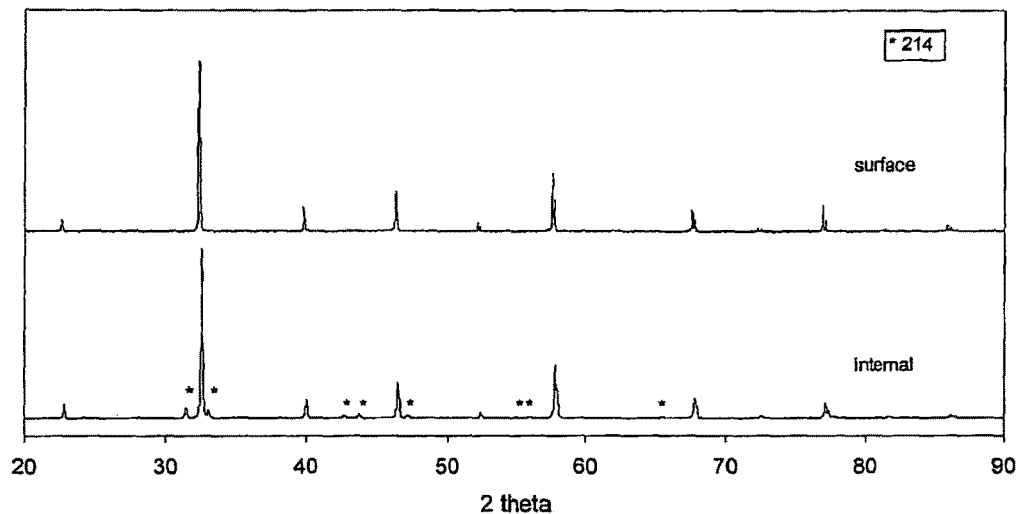
FIG. 3 shows surface and internal X-ray diffraction (XRD) patterns of a La$_{0.20}$Sr$_{0.80}$Ga$_{0.80}$Mg$_{0.20}$O$_{2.8}$ pellet.

FIG. 3 illustrates two XRD patterns of a pellet prepared at 1450° C. for 5 hours with said powder. The surface XRD pattern shows no trace of the $LaSrGaO_4$ phase (therein marked as 214), whereas this phase is detected inside the pellet.

$La_{0.20}Sr_{0.80}Ga_{0.80}Mg_{0.20}O_{2.8}$ showed a relative density of 98% measured by the Archimedes method with water as the displacement liquid (PSS model apparatus, Gibertini, Italy). A content of $LaSrGaO_4$ of 3 vol % was calculated from the XRD pattern as the percentage ratio between the intensity of the main peak of $LaSrGaO_4$ and the intensity of the main peak of LSGM.

EXAMPLE 4

Electrochemical Device Assembly

The electrolyte membrane was prepared in pellet form according to Example 3. The pellet was prepared from 0.25 g in a cylindrical shape with 13 mm of diameter and a thickness of 200 μm. Onto one side, a layer of slurry of $La_{0.60}Sr_{0.40}Fe_{0.80}CO_{0.20}O_{3-\delta}$/$Ce_{0.8}Gd_{0.20}O_{1.9}$ in isopropyl alcohol (as from Example 2) was painted and thermally treated in air at 1100° C. for 2 hours to obtain the cathode. A layer of $Cu_{0.47}Ni_{0.53}$ and $Ce_{0.8}Gd_{0.20}O_{1.9}$ slurry in isopropyl alcohol (as from Example 1) was painted onto the other side and thermally treated in air at 1100° C. for 2 hours to obtain the anode.

EXAMPLE 5

Conductivity Tests

The tests were carried out in the temperature range of 400-800° C. using impedance spectroscopy method by a frequency response analyzer Solartron 1255A over a frequency range of 10 Hz-1 MHz. Pt films, obtained from Engelhard-Clal Pt paste, were deposited onto both sides of the electrolyte membrane as electrical contacts and then were treated at 800° C. for 2 h.

Figure 4:
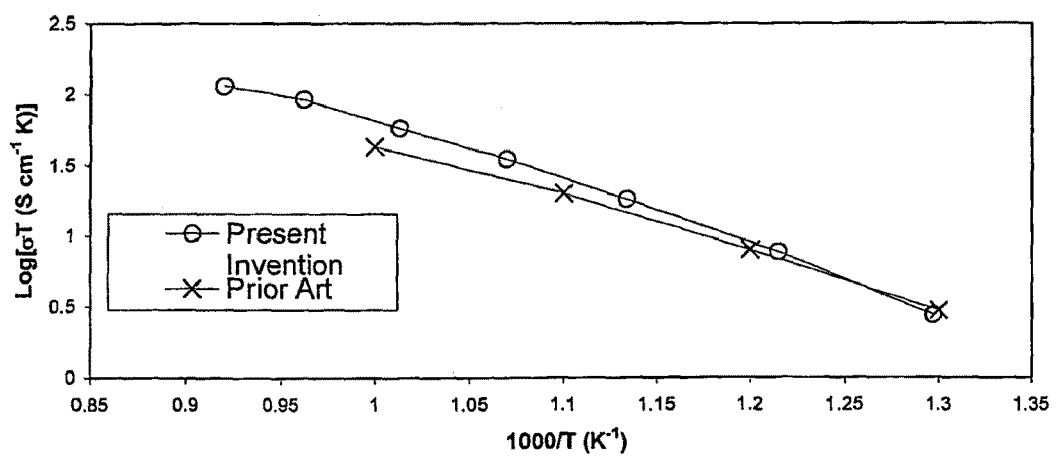
FIG. 4 relates to conductivity values of an electrolyte membrane of the electrochemical device according to the invention and one of the prior art.
Figure 5:
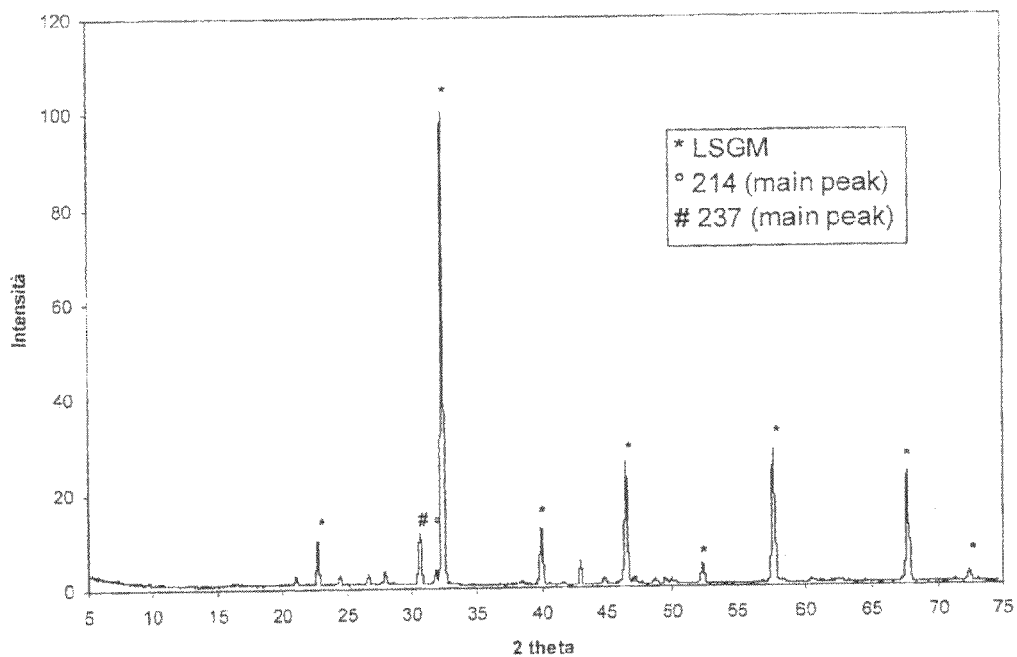
FIG. 5 show an XRD pattern of LSGM according to the prior art.
Figure 6:
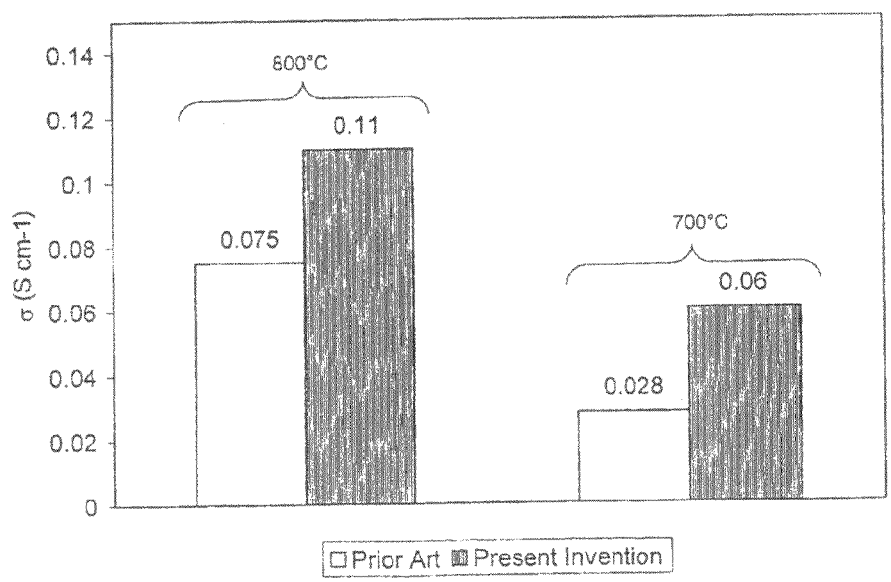
FIG. 6 illustrates a comparison of conductivity values with of an electrolyte membrane of the electrochemical device according to the invention and one of the prior art.

FIG. 4 shows an Arrhenius plot obtained from conductivity values of an electrolyte membrane as from Example 4 compared with that of K. Huang and J. B. Goodenough, Journal of Alloys and Compounds, 303-304 (2000), 454-464 which was prepared by repeating the teachings of this paper and was found to have a relative density of 80% and to contain $LaSrGaO_4$ (214) in an amount of 3.9 vol % and $LaSrGa_3O_7$ (237) in an amount of 14.4 vol %, as from the XRD pattern of FIG. 5. Another test was carried out as the previously described one. The conductivity of the electrolyte membrane obtained as from Example 4 was compared with that disclosed by U.S. Pat. No. 6,004,688. FIG. 6 reports the comparison of conductivity values at 700° C. and 800° C. The conductivity of the electrolyte membrane of the invention is higher.

EXAMPLE 6

Stability Test at the Anode/Electrolyte Membrane Interface

Figure 7:
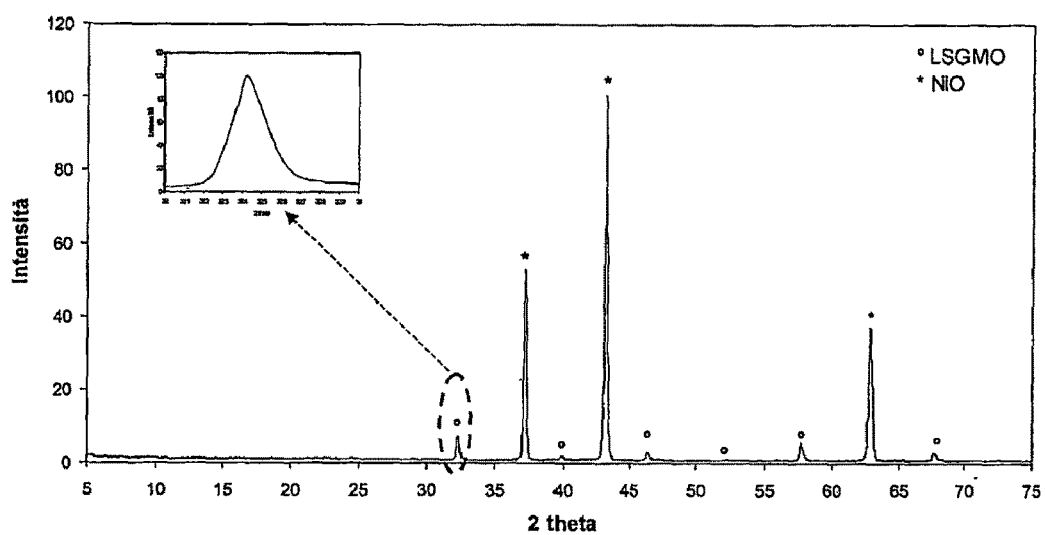
FIG. 7 shows the XRD pattern of a, stability study at the anode/electrolyte membrane interface.

The possible formation of $LaNiO_3$ phase at the anode/electrolyte membrane interface was monitored. As already discussed above, such a phase represents an insulating layer between anode and electrolyte membrane thus impairing the electrochemical device performance. On an electrolyte membrane layer as from Example 3 a NiO layer was painted, and the whole was treated at 1100° C. for 2 h. The presence of LaNiO$_3$ phase provides a peak at 2θ32.92° in the XRD, as illustrated by Zhang et al., Solid State Ionics 133 (2000), 153-160. After the treatment at 1100° C., such a peak was not detectable. The anode/electrolyte membrane assembly was further treated at 1200° C. for 2 h. After the treatment at 1200° C., such a peak was not detectable as from the XRD pattern of FIG. 7. Also, SEM/EDX showed that there is no migration of Ni to the electrolyte and also there is no La in the anodic side that can form the LaNiO$_3$.

In the electrochemical device of the invention the electrolyte membrane containing LSGM is in direct contact with an anode containing nickel without the formation of the non-conductive phase LaNiO$_3$.

The invention claimed is:

1. An electrochemical device comprising an anode, a cathode and an electrolyte membrane disposed between said anode and said cathode, wherein said electrolyte membrane comprises a material of formula $$La_{1-x}Sr_xGa_{1-y}Mg_yO_{3-0.5(x+y)}$$

wherein x and y are independently a value of 0.1 to 0.3, said material having a relative density of at least 90% and comprising LaSrGaO$_4$ in a percentage of 0.05 vol % to 10 vol %; and wherein said electrolyte membrane material is substantially free of LaSrGa$_3$O$_7$.

2. The electrochemical device according to claim 1, wherein said electrochemical device is a solid oxide fuel cell, a molten carbonate fuel cell, a gas separator or a gas sensor.

3. The electrochemical device according to claim 1, wherein the anode and the cathode have a porosity of at least 10%.

4. The electrochemical device according to claim 3, wherein the anode and the cathode have a porosity of at least 30%.

5. The electrochemical device according to claim 1, wherein the anode comprises a cermet wherein the metallic portion is an alloy comprising nickel and at least a second metal selected from aluminium, titanium, molybdenum, cobalt, iron, chrome, copper, silicon, tungsten and niobium, and the ceramic portion is selected from doped ceria and La$_{1-x}$Sr$_x$Ga$_{1-y}$Mg$_y$O$_{3-0.5(x+y)}$ wherein x and y are as in claim 1.

6. The electrochemical device according to claim 5, wherein said alloy has an average particle size not higher than 20 nm.

7. The electrochemical device according to claim 6, wherein said alloy has an average particle size not higher than 16 nm.

8. The electrochemical device according to claim 5, wherein said alloy has a mean surface area higher than 20 m$^2$/g.

9. The electrochemical device according to claim 8, wherein said alloy has a mean surface area higher than 30 m$^2$/g.

10. The electrochemical device according to claim 9, wherein said alloy has a mean surface area higher than 40 m$^2$/g.

11. The electrochemical device according to claim 5, wherein said alloy has a second metal content of about 1% by weight to about 99% by weight.

12. The electrochemical device according to claim 11, wherein said alloy has a second metal content of about 40% by weight to about 60% by weight.

13. The electrochemical device according to claim 5, wherein said second metal is copper.

14. The electrochemical device according to claim 5, wherein said alloy has a nickel content of about 1% by weight to about 99% by weight.

15. The electrochemical device according to claim 14, wherein said alloy has a nickel content of about 30% by weight to about 70% by weight.

16. The electrochemical device according to claim 15, wherein said alloy has a nickel content of 50% by weight.

17. The electrochemical device according to claim 5, wherein said ceramic portion has a particle size not higher than 50 nm.

18. The electrochemical device according to claim 17, wherein said ceramic portion has a particle size of 1 to 25 nm.

19. The electrochemical device according to claim 5, wherein said ceramic portion is doped ceria.

20. The electrochemical device according to claim 19, wherein said ceramic portion is selected from gadolinia-doped ceria and samaria-doped ceria.

21. The electrochemical device according to claim 5, wherein said anode comprises cerium oxide.

22. The electrochemical device according to claim 1, wherein said anode contains nickel and said electrolyte membrane is in direct contact with at least said anode.

23. The electrochemical device according to claim 1, wherein said anode comprises a ceramic containing at least one of cobalt and iron, said ceramic being mixed with doped ceria.

24. The electrochemical device according to claim 23, comprising a ratio of ceramic/doped ceria of 50:50 to 95:5.

25. The electrochemical device according to claim 24, comprising a ratio of ceramic/doped ceria of 60:40 to 80:20.

26. The electrochemical device according to claim 23, wherein said ceramic has a perovskite or a perovskite-related structure.

27. The electrochemical device according to claim 23, wherein said ceramic contains cobalt and iron.

28. The electrochemical device according to claim 23, wherein said ceramic is La$_{0.6}$Sr$_{0.4}$Co$_{0.2}$Fe$_{0.8}$O$_{3-\delta}$.

29. The electrochemical device according to claim 1, wherein the cathode comprises a ceramic selected from:

La$_{1-e}$Sr$_e$Mn$_f$O$_{3-\delta}$, wherein e and f are independently equal to a value of 0 to 1, and δ is from stoichiometry; and La$_{1-c}$Sr$_c$Co$_{1-d}$Fe$_d$O$_{3-\delta}$, wherein c and d are independently equal to a value of from 0 to 1, and δ is from stoichiometry.

30. The electrochemical device according to claim 1, wherein the cathode comprises doped ceria.

31. The electrochemical device according to claim 1, wherein the electrolyte membrane material of formula La$_{1-x}$Sr$_x$Ga$_{1-y}$Mg$_y$O$_{3-0.5(x+y)}$ has a perovskite structure.

32. The electrochemical device according to claim 1, wherein the electrolyte membrane material is of formula La$_{0.8}$Sr$_{0.2}$Ga$_{0.8}$Mg$_{0.2}$O$_{3-\delta}$.

33. The electrochemical device according to claim 1, wherein the electrolyte membrane material has a relative density of 95% to 99%.

34. The electrochemical device according to claim 1, wherein LaSrGaO$_4$ is present in a percentage of 0.1 vol % to 6 vol %.

35. The electrochemical device according to claim 1, wherein LaSrGaO$_4$ is in an amount increasing from the surface to the interior of the electrolyte, membrane.

36. The electrochemical device according to claim 35, wherein the amount of LaSrGaO$_4$ at the surface of the electrolyte membrane is substantially null.

37. A method for producing energy comprising the steps of:
  feeding at least one fuel into an anode side of a solid oxide fuel cell comprising an anode, a cathode and an electrolyte membrane disposed between said anode and said cathode, wherein said electrolyte membrane comprises a material of formula $La_{1-x}Sr_xGa_{1-y}-Mg_yO_{3-0.5(x+y)}$ wherein x and y are independently a value of 0.1 to 0.3, said material having a relative density of at least 90% and comprising $LaSrGaO_4$ in a percentage of 0.05 vol % to 10 vol %; and wherein said electrolyte membrane material is substantially free of $LaSrGa_3O_7$;
  feeding an oxidant into a cathode side of said solid oxide fuel cell; and
  oxidizing said at least one fuel in said solid oxide fuel cell, resulting in production of energy.

38. The method according to claim 37, wherein the fuel is hydrogen an alcohol, methanol, ethanol, propanol, a hydrocarbon in gaseous form, methane, ethane, butene; carbon dioxide, carbon monoxide, natural gas, reformed natural gas, biogas, syngas and mixtures thereof, in the presence of water, steam fuel, or an hydrocarbon in liquid form, diesel, toluene, kerosene and jet fuels.

39. The method according to claim 38, wherein the fuel is methane.

40. The method according to claim 38, wherein the fuel is substantially dry.

41. The method according to claim 40, wherein the fuel is substantially dry methane.

42. The method according to claim 37, wherein the solid oxide fuel cell operates at a temperature of 400° C. to 800° C.

43. The method according to claim 40, wherein the solid oxide fuel cell operates at a temperature of 500° C. to 700° C.

44. A method for separating oxygen from a gas mixture, comprising the steps of:
  feeding the gas mixture into a cathode side of a gas separator comprising an anode, a cathode and an electrolyte membrane disposed between said anode and said cathode, wherein said electrolyte membrane comprises a material of formula $La_{1-x}Sr_xGa_{1-y}Mg_yO_{3-0.5(x+y)}$, wherein x and y are independently a value of 0.1 to 0.3, said material having a relative density of at least 90% and comprising $LaSrGaO_4$ in a percentage of 0.05 vol % to 10 vol %; and wherein said electrolyte membrane material is substantially free of $LaSrGa_3O_7$;
  applying an external potential difference between the cathode and the anode;
  dissociating the oxygen at the cathode to yield oxygen ions;
  diffusing the oxygen ions through the electrolyte membrane from the cathode to the anode; and
  converting the diffused oxygen ions to oxygen at the anode.

45. The method according to claim 44, wherein the gas mixture is air.

* * * * *